US010843276B2

(12) United States Patent
Presley et al.

(10) Patent No.: US 10,843,276 B2
(45) Date of Patent: Nov. 24, 2020

(54) ROTARY TOOL ACCESSORY FOR INSTALLATION OF HOOD CUSHIONS

(71) Applicant: Toyota Motor Engineering & Manufacturing North America, Inc., Erlanger, KY (US)

(72) Inventors: Paul E. Presley, Richmond, KY (US); Bryan Hodel, Frankfort, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 158 days.

(21) Appl. No.: 15/707,547

(22) Filed: Sep. 18, 2017

(65) Prior Publication Data

US 2019/0084055 A1 Mar. 21, 2019

(51) Int. Cl.
*B25B 27/00* (2006.01)
*B23B 45/00* (2006.01)
*B25B 13/50* (2006.01)
*B25B 23/10* (2006.01)

(52) U.S. Cl.
CPC ........ *B23B 45/003* (2013.01); *B25B 13/5091* (2013.01); *B25B 23/101* (2013.01); *B25B 27/0035* (2013.01)

(58) Field of Classification Search
CPC ....... B23B 45/003; E21B 19/16; B25B 13/48; B25B 13/481; B25B 13/5091; B25B 17/00; B25B 23/101; B25B 27/0035; B25B 23/00; B25B 27/00
See application file for complete search history.

(56) References Cited

U.S. PATENT DOCUMENTS

| 1,507,362 | A | * | 9/1924 | Bartosik | ................. B25B 13/06 81/55 |
| 2,549,397 | A | * | 4/1951 | Sparks | ................ B25B 23/0035 403/328 |
| 4,406,334 | A | | 9/1983 | Baumann et al. | |

(Continued)

OTHER PUBLICATIONS

EBAY, "Eurotec Drill Stop Bohrsenker Terrassendielen vorbohren ausreiben senken 945618", Retrieved from the Internet: <http://www.ebay.com/itm/Drill-Stop-Bohrsenker-Holz-Terrassendielen-vorbohren-ausreiben-senken-945618-/110382249872>, Retrieved Sep. 8, 2017, 7 pages.

(Continued)

*Primary Examiner* — Robert J Scruggs
(74) *Attorney, Agent, or Firm* — Christopher G. Darrow; Darrow Mustafa PC

(57) ABSTRACT

A rotary tool accessory for installing a hood cushion in a vehicle component. The tool accessory includes a base portion structured to contact a hood cushion so as to enable rotation of the hood cushion by rotating the base portion. A hood cushion confinement portion is structured to enclose a portion of the hood cushion so as to limit or prevent radial expansion of the hood cushion during installation of the cushion into the vehicle component. The confinement portion is also structured and adjustably attachable to the base portion so as to control a movement of the base portion toward the surface of the component of the vehicle, such that a portion of the hood cushion extends past the surface of the vehicle component in a direction toward the base portion when the hood cushion has been completely installed in the vehicle component.

15 Claims, 12 Drawing Sheets

(56) References Cited

U.S. PATENT DOCUMENTS

| | | | | | |
|---|---|---|---|---|---|
| 4,940,370 | A | * | 7/1990 | Gipson | B25B 27/18 |
| | | | | | 29/802 |
| 5,520,075 | A | * | 5/1996 | Barmore | B25B 13/06 |
| | | | | | 81/437 |
| 5,724,872 | A | * | 3/1998 | Shih | B25B 13/06 |
| | | | | | 81/125 |
| 7,237,291 | B2 | * | 7/2007 | Redford | B25B 13/06 |
| | | | | | 7/138 |
| 7,281,310 | B2 | * | 10/2007 | Moore | B25B 13/06 |
| | | | | | 29/456 |
| 7,290,469 | B2 | * | 11/2007 | Walters | B25B 13/105 |
| | | | | | 81/185 |
| 8,621,961 | B2 | * | 1/2014 | Burch | B25B 15/02 |
| | | | | | 81/9.4 |
| 2013/0327188 | A1 | * | 12/2013 | Wilson | B25B 15/007 |
| | | | | | 81/441 |

OTHER PUBLICATIONS

ALIEXPRESS, "TASP Multipurpose Cutting Guide Mini Drill Attachment Rotary Tool Accessories", Retrieved from the Internet: <http://www.aliexpress.com/item/Free-Shipping-Dremel-Accessories-Multipurpose-Cutting-Guide-Attachment/1991457198.html>, Retrieved Sep. 8, 2017, 4 pages.

* cited by examiner

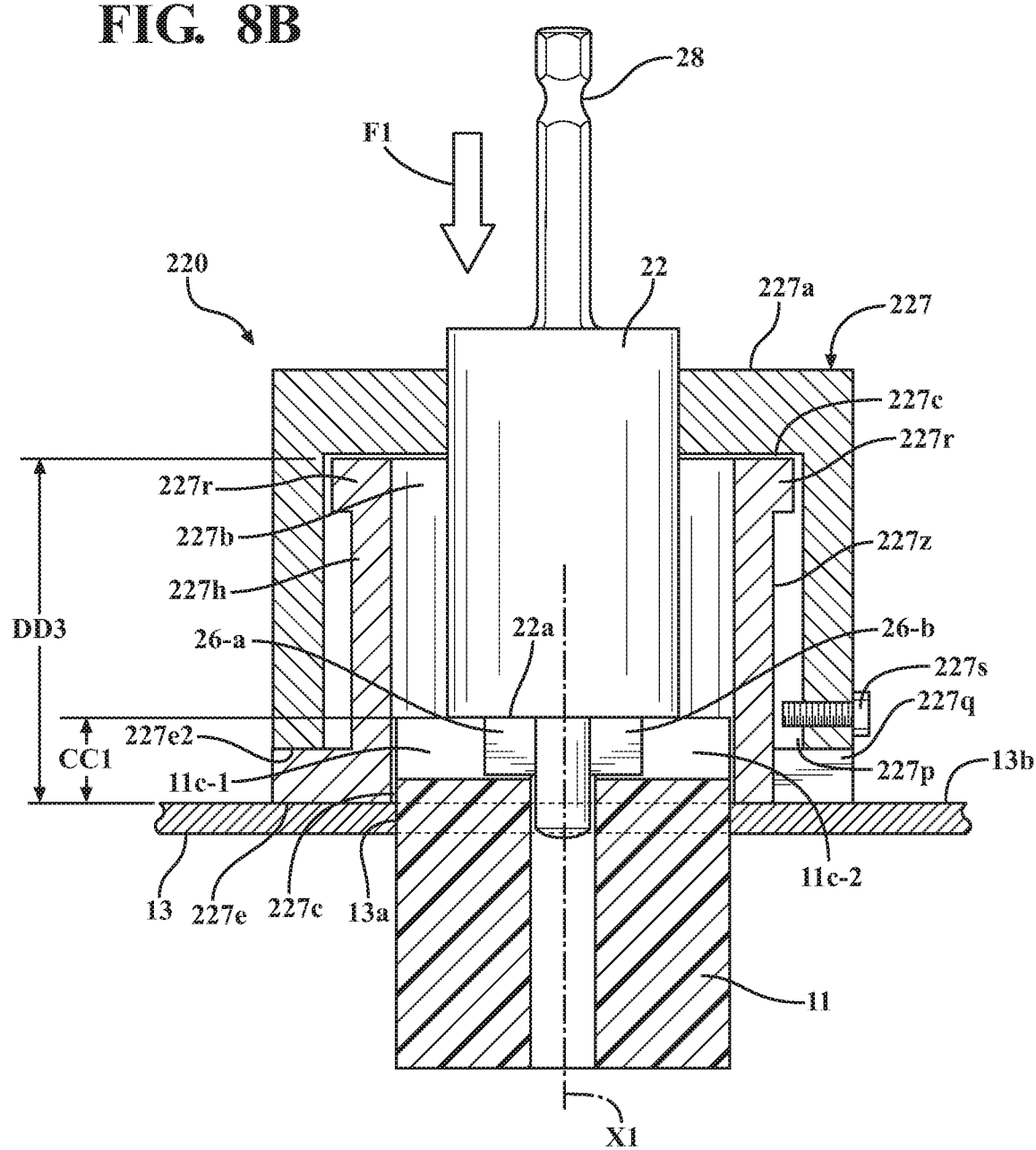

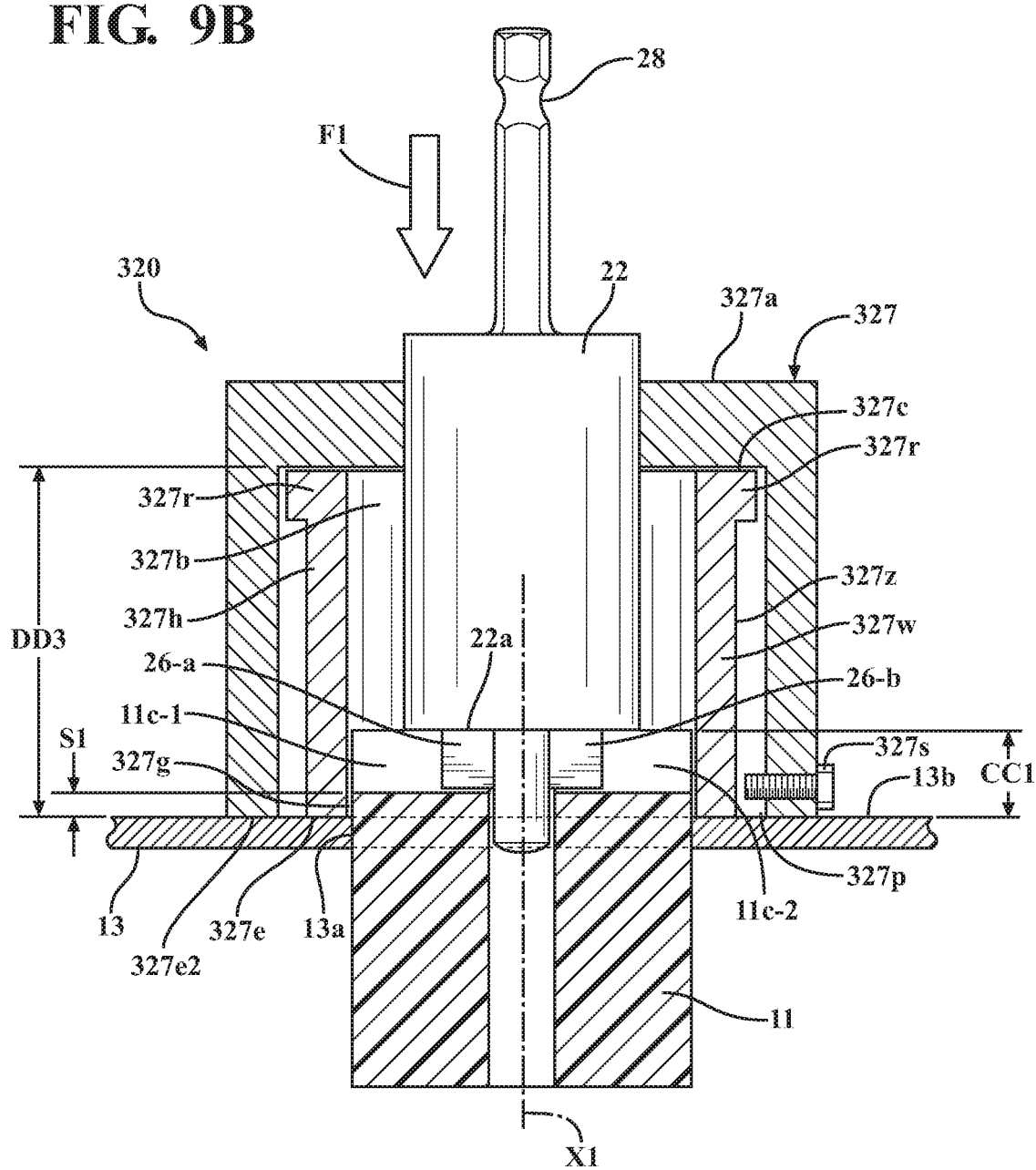

ROTARY TOOL ACCESSORY FOR INSTALLATION OF HOOD CUSHIONS

TECHNICAL FIELD

The present invention relates to accessories for assembly tools and, more particularly, to a rotary tool accessory structured to facilitate installation of hood cushions in a component of a vehicle.

BACKGROUND

Hood cushions may be installed in a component of a vehicle to cushion the vehicle hood when it is dropped into a closed position for securement. The component of the vehicle into which the cushions are installed may be, for example, a cross-member structured to be secured under a front portion of the vehicle hood, behind and above the vehicle front grill. Hood cushions may be installed in mounting holes formed in the cross-member along a length of the cross-member. The hood cushions may be formed from a resiliently compressible cushioning material, such as a rubber. The hood cushions and cross-member mounting holes may be dimensioned with respect to each other so that an interference fit is formed between each hood cushion and the edges of the hole into which it is inserted. Each of the hood cushions is installed in the cross-member such that a portion of the cushion extends above an upper surface of the cross-member. This portion of the cushion extending above the cross-member acts to cushion the hood. The interference fit between the parts acts to maintain the cushion in its completely installed position.

It can be strenuous and time-consuming to install the hood cushions by hand. An end of the cushion must be pinched by hand and forced into the mounting hole. Then, to reduce friction between the cushion and the edges of the mounting hole, an assembler must rotate the cushion about an insertion axis extending into the mounting hole while simultaneously applying an insertion force along the insertion axis. In addition, because the hood cushion may be formed from a rubber or other resiliently deformable material, the hood cushion may be radially expandable under application of the insertion force. This radial expansion may interfere with insertion of the cushion deeper into the hole, to the degree that the installation force required to completely install the cushion in the cross-member becomes prohibitive. This may exacerbate the difficulty of installing the cushion.

SUMMARY

In one aspect of the embodiments described herein, a rotary tool accessory is provided for installing a hood cushion in a component of a vehicle, The rotary tool accessory includes a base portion structured to contact a hood cushion so as to enable rotation of the hood cushion by rotating the base portion, and so as to enable application of an insertion force to the hood cushion through the base portion and in a direction toward the component of the vehicle. A hood cushion confinement portion is structured to enclose a portion of the hood cushion so as to limit or prevent radial expansion of the portion of the hood cushion during installation of the hood cushion into the component of the vehicle. The hood cushion confinement portion defines a cavity structured to receive the portion of the hood cushion therein. The cavity has an opening structured to receive the portion of the hood cushion therethrough during installation of the hood cushion in the component of the vehicle. The hood cushion confinement portion is structured to contact a surface of the component of the vehicle during operation of the rotary tool accessory to install the hood cushion in the vehicle component. The hood cushion confinement portion is also structured and adjustably attachable to the base portion so as to control a movement of the base portion toward the surface of the component of the vehicle, such that a portion of the hood cushion extends past the surface of the component of the vehicle in a direction toward the base portion when the hood cushion has been completely installed in the component of the vehicle.

BRIEF DESCRIPTION OF THE DRAWINGS

FIG. 8B is the view of FIG. 8A showing the hood cushion completely installed in the vehicle component.

FIG. 9B is the view of FIG. 9A showing the hood cushion completely installed in the vehicle component.

DETAILED DESCRIPTION

Embodiments described herein relate to a rotary tool accessory which aids installation of a hood cushion in a component of a vehicle. The rotary tool accessory includes a base portion structured to contact a hood cushion so as to enable rotation of the hood cushion by rotating the base portion, and so as to enable application of an insertion force to the hood cushion through the base portion and in a direction toward the component of the vehicle. A hood cushion confinement portion is structured to enclose a portion of the hood cushion so as to limit or prevent radial expansion of the enclosed portion of the hood cushion during installation of the hood cushion into the component of the vehicle. The hood cushion confinement portion is also structured to contact a surface of the component of the vehicle during operation of the rotary tool accessory to install the hood cushion in the vehicle component. The hood cushion confinement portion is also structured and adjustably attachable to the base portion so as to control a movement of the base portion toward the surface of the component of the vehicle, such that a portion of the hood cushion extends past the surface of the component of the vehicle in a direction toward the base portion when the hood cushion has been completely installed in the component of the vehicle.

Figure 1:
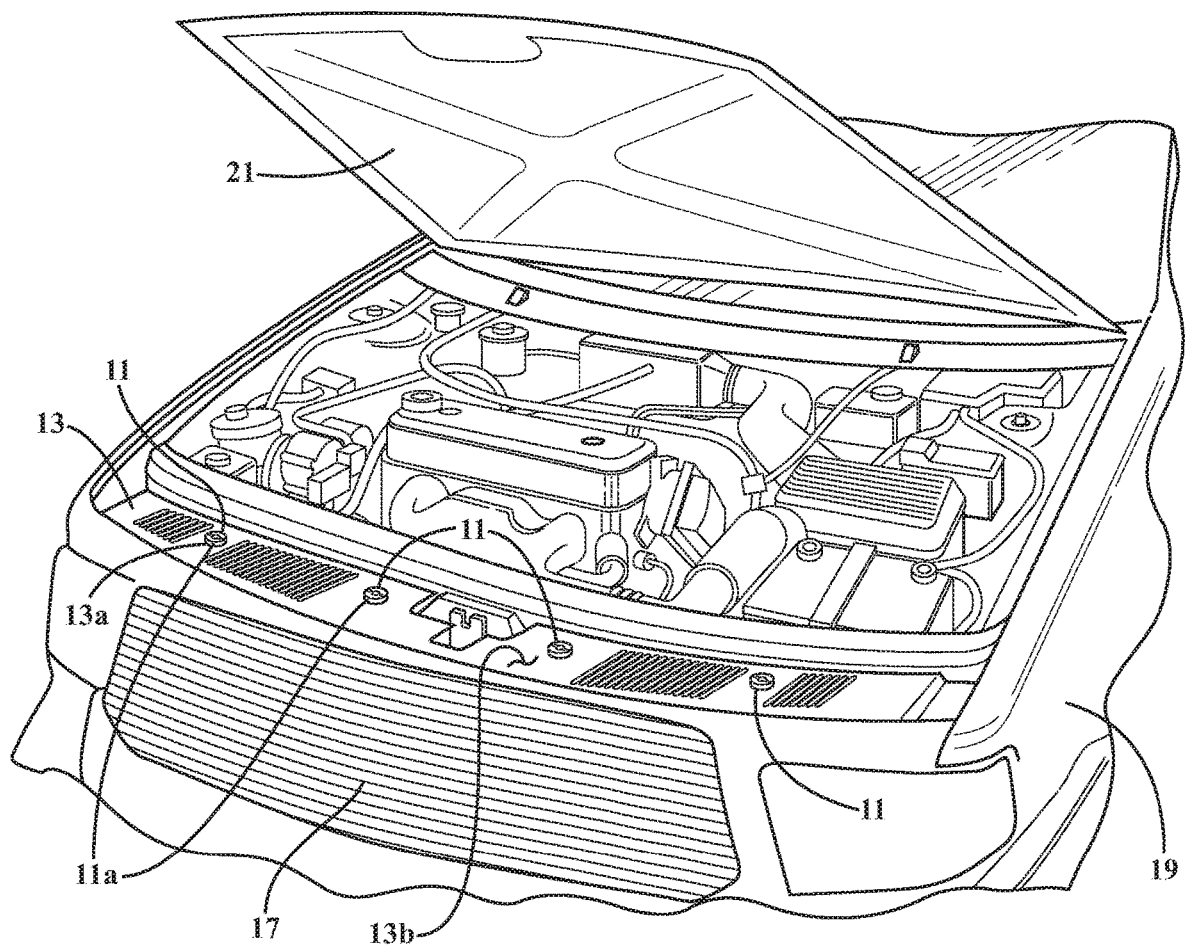
FIG. 1 shows a schematic perspective view of a front portion of a vehicle with an open hood, and showing an example of installation of multiple hood cushions into a component of the vehicle.

FIG. 1 shows a schematic perspective view of a front portion of a vehicle with an open hood 21, and showing an example of installation of multiple hood cushions 11 into a component 13 of the vehicle. The component 13 of the vehicle into which the cushion is installed may be, for example, a cross-member structured to be secured under a front portion of the vehicle hood 21 and behind and above the vehicle front grill 17, as shown in FIG. 1.

Hood cushions 11 may be installed in associated holes 13a formed in the cross-member 13 along a length of the cross-member. The hood cushions 11 may be formed from a resiliently compressible cushioning material, such as a rubber. The hood cushions 11 and cross-member mounting holes 13a may be dimensioned with respect to each other so that an interference fit is formed between each hood cushion 11 and the edges of the hole 13a into which it is inserted. Hood cushions 11 may be installed in the cross-member 13 prior to attachment of the cross-member 13 to the remainder of the vehicle 19, or the hood cushions 11 may be installed in the cross member 13 after the cross-member has been installed in the vehicle 19.

Each of the hood cushions 11 is installed in the cross-member 13 such that a portion 11a of the cushion 11 extends above an upper surface 13b of the cross-member 13. This portion 11a of the cushion 11 extending above the cross-member upper surface 13b acts to cushion the hood 21 when the hood is dropped or forced into a closed position. The interference fits between the hood cushion 11 and the edges of the holes 13a act to maintain the hood cushion 11 in its fully installed position.

Figure 2:
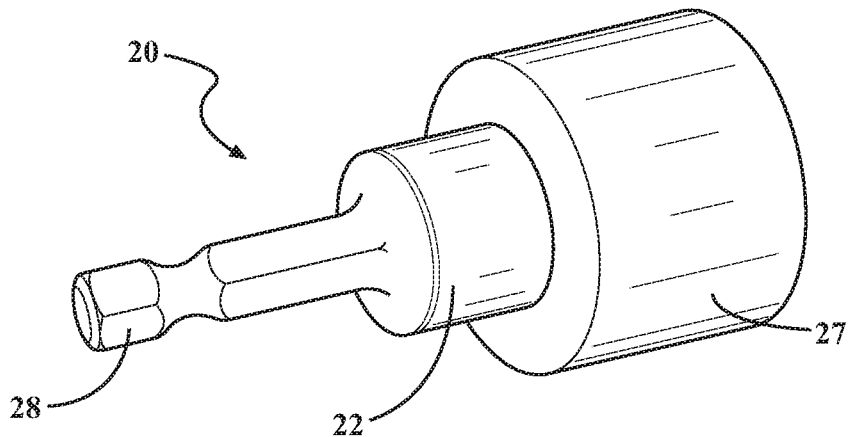
FIG. 2 is a side perspective view of an embodiment of a rotary tool accessory structured to install a hood cushion in a component of a vehicle, as shown in FIG. 1.
Figure 3:
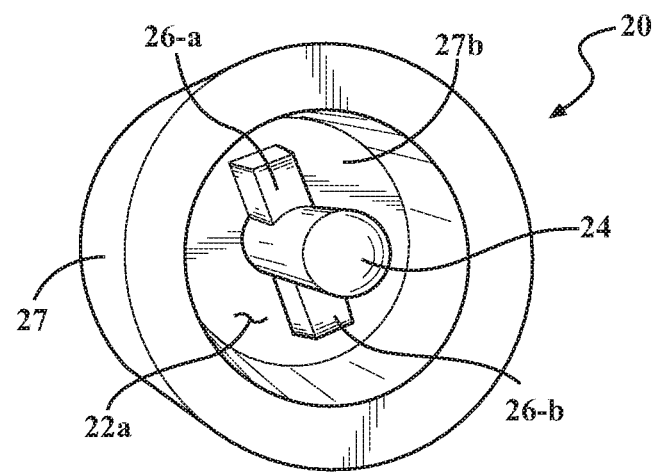
FIG. 3 is an end view of the rotary tool accessory shown in FIG. 2, showing an interior of a hood cushion confinement portion cavity.
Figure 4:
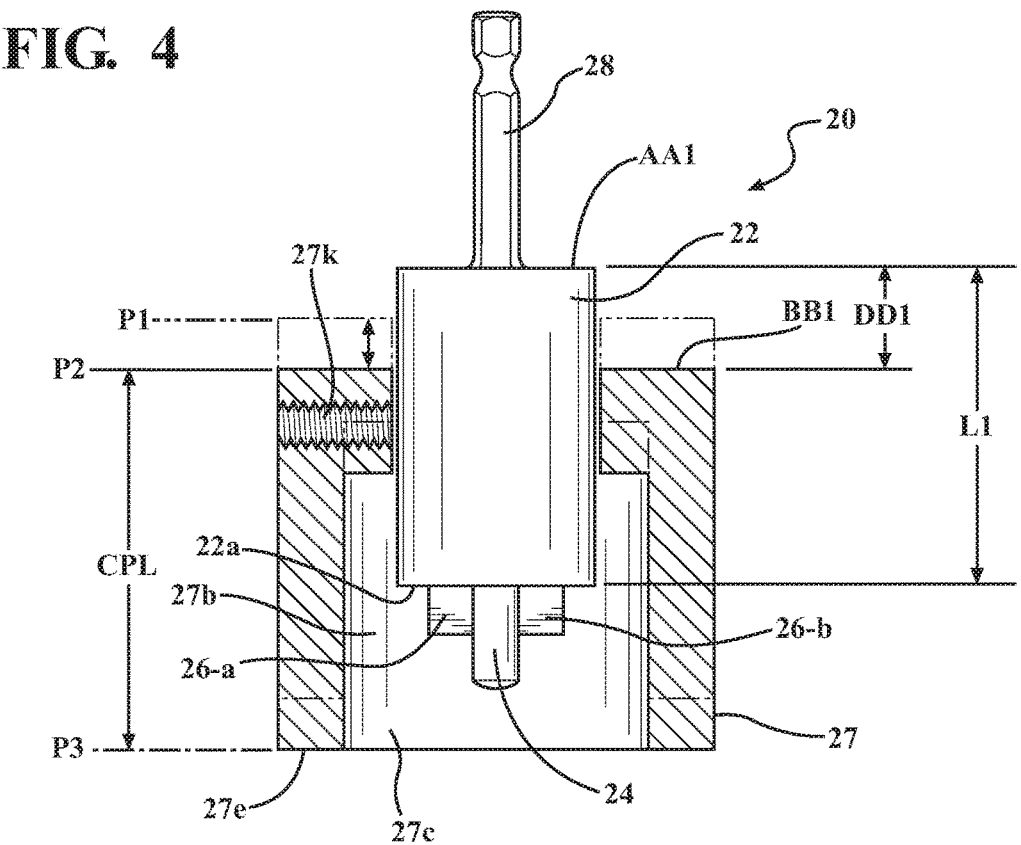
FIG. 4 is a schematic cross-sectional side view of the rotary tool accessory shown in FIGS. 2 and 3.

FIG. 2 is a perspective view of an embodiment 20 of a rotary tool accessory structured to install a hood cushion 11 in a component 13 of a vehicle, as shown in FIG. 1. FIG. 3 is an end view of the rotary tool accessory 20 shown in FIG. 2, showing an interior of a hood cushion confinement portion cavity 27b of the rotary tool accessory. FIG. 4 is a schematic cross-sectional side view of the rotary tool accessory shown in FIGS. 2 and 3. In the embodiment shown in FIGS. 2-4, rotary tool accessory 20 has a base portion 22 and a hood cushion confinement portion 27 attached to the base portion.

Referring to FIGS. 2-4, the rotary tool accessory base portion 22 is structured to contact the hood cushion 11 so as to enable rotation of the hood cushion 11 by rotating the base portion 22. The base portion 22 is also structured to contact the hood cushion 11 so as to enable application of an insertion force to the hood cushion 11 through the base portion 22 and in a direction toward the component 13 of the vehicle. The rotary tool accessory base portion 22 provides a structure to which the hood cushion confinement portion 27 may be mounted and secured, and may also support a trunk portion 24 and at least one engagement portion 26 structured to engage the hood cushion 11 for installation. Although the base portion 22 shown in the drawings has cylindrical shape, the base portion 22 may have any alternative shape suitable for the purposes described herein. The base portion 22 may be formed from steel or any other suitable material.

Base portion 22 is structured to be operatively coupled to a rotary tool (not shown) so as to be rotatable by the rotary tool. A coupling portion 28 may extend from the base portion 22 and is structured to enable operative coupling of the rotary tool accessory 20 to a rotary tool (not shown), such as a pneumatically-powered screw driver or bolt driver, for example. In one or more arrangements, the coupling portion 28 may have an end with a hexagonal shape (shown in FIG. 2) or any other shape suitable for securement in a standard tool chuck. The coupling portion 28 may be formed integrally with base portion 22 or the coupling portion 28 may be formed as a separate part and attached to the base portion 22 using welding, adhesives, or any other suitable method.

In one or more arrangements, a trunk portion 24 may be structured to extend into central opening 11b (FIGS. 5A,5B) formed in the hood cushion 11 during operation of the rotary tool accessory 20 to install the hood cushion 11 in the vehicle component 13. The trunk portion 24 may be sized in relation to an inner diameter of a wall 11w defining central opening 11b so that the trunk portion 24 engages the wall in an interference fit. The interference fit formed between the wall 11w and the trunk portion 24 may aid the rotary tool accessory 20 in gripping and rotating the hood cushion 11 during installation of the hood cushion in the vehicle component 13.

In one or more arrangements, for purposes of contacting the hood cushion 11 so as to enable application of an insertion force to the hood cushion 11 through the base portion 22 and in a direction toward the component 13 of the vehicle, the base portion 22 may include a bearing surface 22a structured to contact the hood cushion 11 so as to enable application of the insertion force through the bearing surface to the hood cushion. Bearing surface 22a may be structured to contact an uppermost exterior surface 11u of the hood cushion 11 during installation of the hood cushion 11 in the vehicle component 13. An insertion force F1 acting in the direction of the vehicle component 13 may be applied to the hood cushion surface 11u through the bearing surface 22a at the same time that the base portion 22 is rotating the hood cushion through contact between the engagement portion(s) 26 and the hood cushion 11. Insertion force F1 acts to drive the hood cushion 11 deeper into an associated hole 13a of the vehicle component 13 during rotation of the hood cushion 11.

In one or more arrangements, for purposes of contacting the hood cushion 11 so as to enable rotation of the hood cushion 11 by rotating the base portion 22, at least one engagement portion 26 may be supported by the base portion 22. The at least one engagement portion may be structured to engage a complementary engagement portion of a hood cushion, to enable rotation of the hood cushion 11 by rotating the base portion 22. The embodiment shown in FIGS. 2-4 includes a pair of engagement portions in the form of a first projection 26-a extending along the trunk portion 24 and a second projection 26-b extending along the trunk portion 24 opposite the first projection. Each of projections 26-a and 26-b may be structured to be received in an associated one of complementary hood cushion cavities 11c-1 and 11c-2 formed in hood cushion 11, to enable rotation of the hood cushion 11 during installation. Although the rotary tool accessory engagement portions 26-a and 26-b shown in FIGS. 2-4 are in the form of projections extending from and along exterior surfaces of the trunk portion 24, the rotary tool accessory engagement portions may have any of a variety of alternative shapes as required or desired for a particular application.

In one or more alternative arrangements, the insertion force F1 may be applied through the projections 26-a and 26-b pressing against associated bottom surfaces of hood cushion cavities 11c-1 and 11c-2, instead of through a base portion bearing surface 22a acting on an upper surface 11u of the hood cushion 11. In other arrangements, the insertion force F1 may be applied to the hood cushion 11 through both a bearing surface 22a and the projections 26-a and 26-b.

Figure 5A:
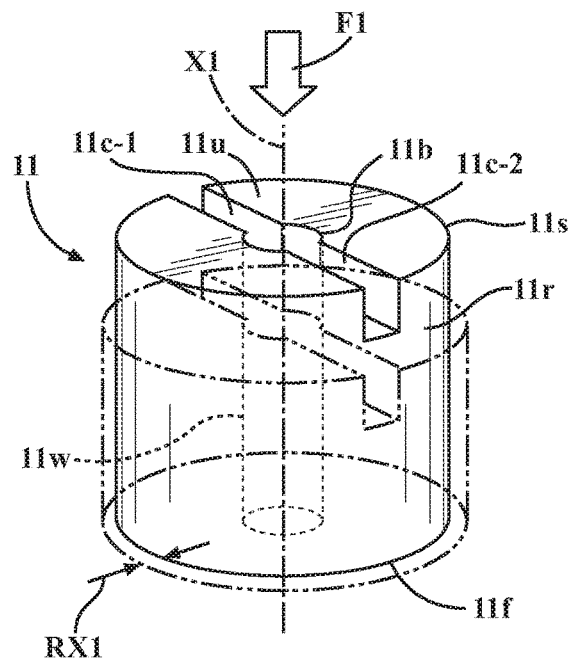
FIG. 5A shows a perspective view of a hood cushion structured for installation into a vehicle component as shown in FIG. 1 by an embodiment of a rotary tool accessory described herein, in a non-deformed state and in a deformed state.
Figure 5B:
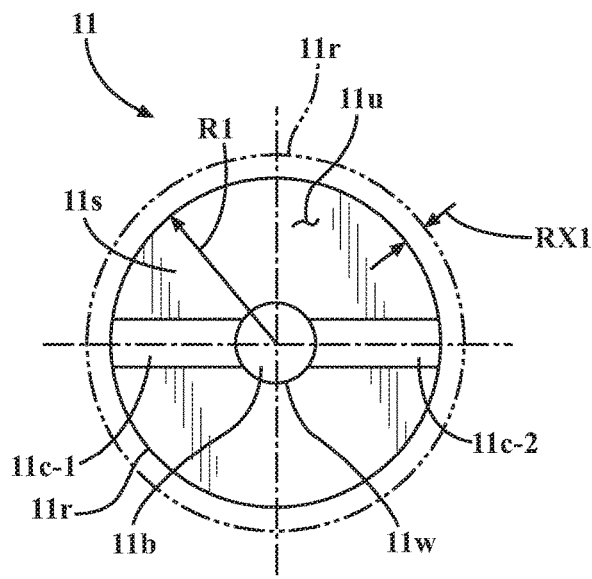
FIG. 5B is a plan view of the hood cushion shown in FIG. 5A, shown in the non-deformed state and in the deformed state.

In one or more arrangements, the hood cushion may have an undeformed shape of a circular cylinder, as shown in FIGS. 5A-5B. Because the hood cushion 11 may be formed from a rubber or other resiliently deformable material, the hood cushion 11 may be laterally or radially expandable under pressure. That is, as shown in FIGS. 5A and 5B, the hood cushion 11 may expand radially (i.e., in directions along a radius R1 of the hood cushion) responsive to application of the installation force or force component F1 in a direction parallel or substantially parallel to a central axis X1 of the hood cushion, and in a direction toward the vehicle component 13.

Referring to FIGS. 5A and 5B, radial expansion of the hood cushion 11 is defined as an amount RX1 by which a radius R1 of the outer surface 11r of a circularly cylindrical hood cushion 11 increases due to application of an installation force or force component F1 acting parallel or substantially parallel to the central axis X1. The radial expansion RX1 may interfere with insertion of the cushion 11 deeper into the vehicle component hole 13a, to the degree that the installation force required to fully install the cushion 11 in the vehicle component 13 becomes more difficult or even prohibitive.

Referring to FIG. 4, the hood cushion confinement portion 27 is structured to enclose a portion of the hood cushion 11 so as to limit or prevent radial expansion of the portion of the hood cushion during installation of the hood cushion 11 into the vehicle component 13. The hood cushion confinement portion 27 defines a cavity 27b structured to receive the portion of the hood cushion 11 therein. The cavity 27b has an opening 27c structured to receive the portion of the hood cushion 11 therethrough during installation of the hood cushion 11 in the component of the vehicle.

Referring again to FIG. 1, embodiments of the hood cushion confinement portion described herein are also structured to contact a surface of the component 13 of the vehicle during operation of the rotary tool accessory to install the hood cushion 11 in the vehicle component. The surface of the vehicle component 13 which the embodiments of the hood cushion confinement portion are structured to contact may be a surface 13b designed to face upwardly when installed in the vehicle, and structured to reside opposite the underside of the hood when the hood is closed.

Figure 6A:
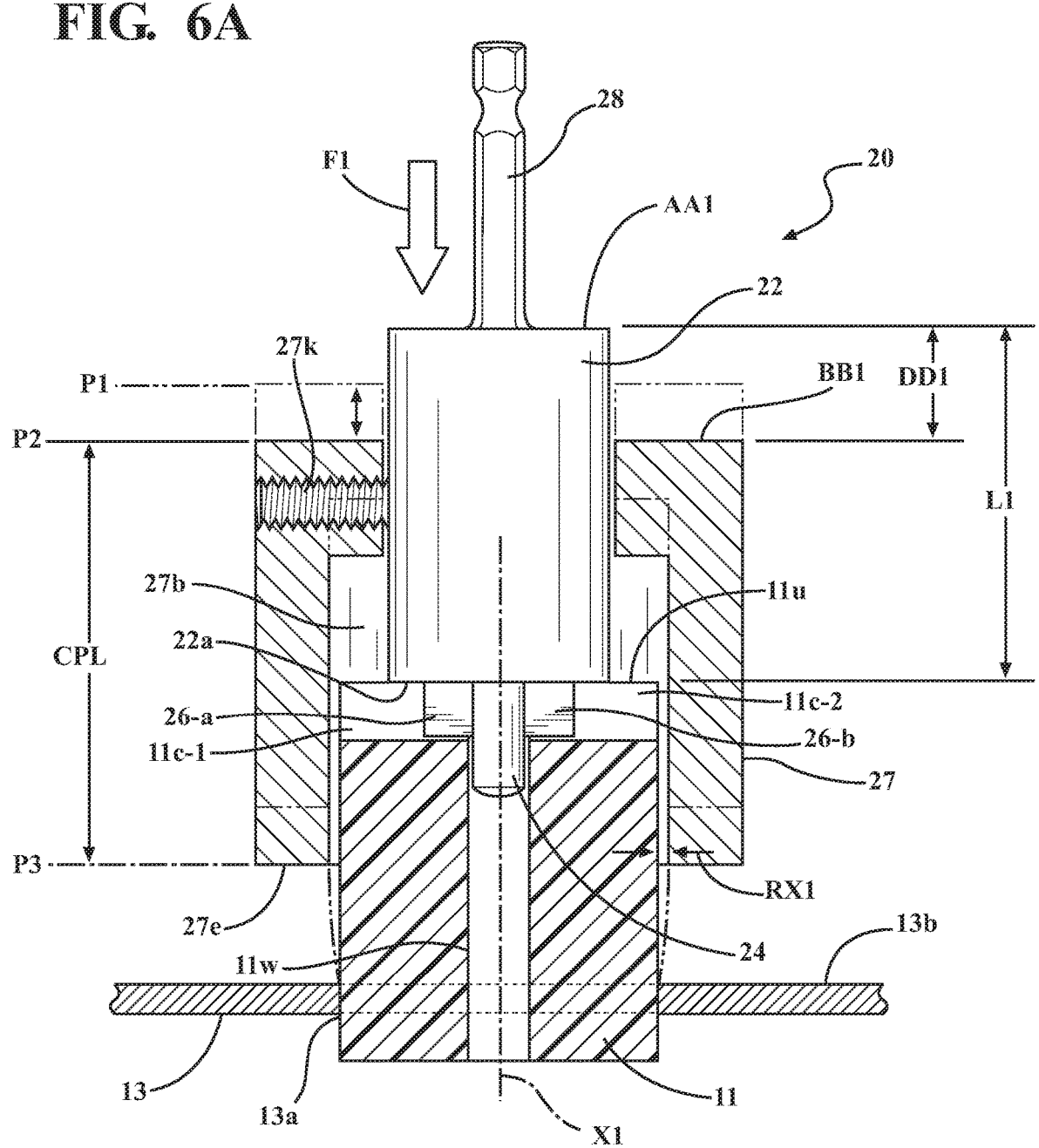
FIG. 6A is a schematic cross-sectional side view showing a hood cushion pre-positioned or partially installed in an opening in a vehicle component, with one embodiment of a rotary tool accessory engaged with the hood cushion prior to rotary tool activation.

Embodiments of the hood cushion confinement portion described herein are also structured and adjustably attachable to the rotary tool accessory base portion 22 so as to control a movement of the base portion 22 toward the surface 13b of the component 13 of the vehicle, such that a portion 11a of the hood cushion 11 will extend past the surface 13b of the component of the vehicle a distance CC1 in a direction toward the base portion 22 when the hood cushion 11 is completely installed in the component of the vehicle. In an assembled vehicle, the extended portion 11a of the cushion 11 extends in a direction toward the hood when the hood is closed. Referring to FIG. 6A, the term "adjustably attachable" means that an attachment location of the hood cushion confinement portion along a length L1 of the base portion 22 may be adjusted to help achieve a desired amount of extension CC1 of the hood cushion above the upper surface 13b of the vehicle component, as described herein.

Figure 6B:
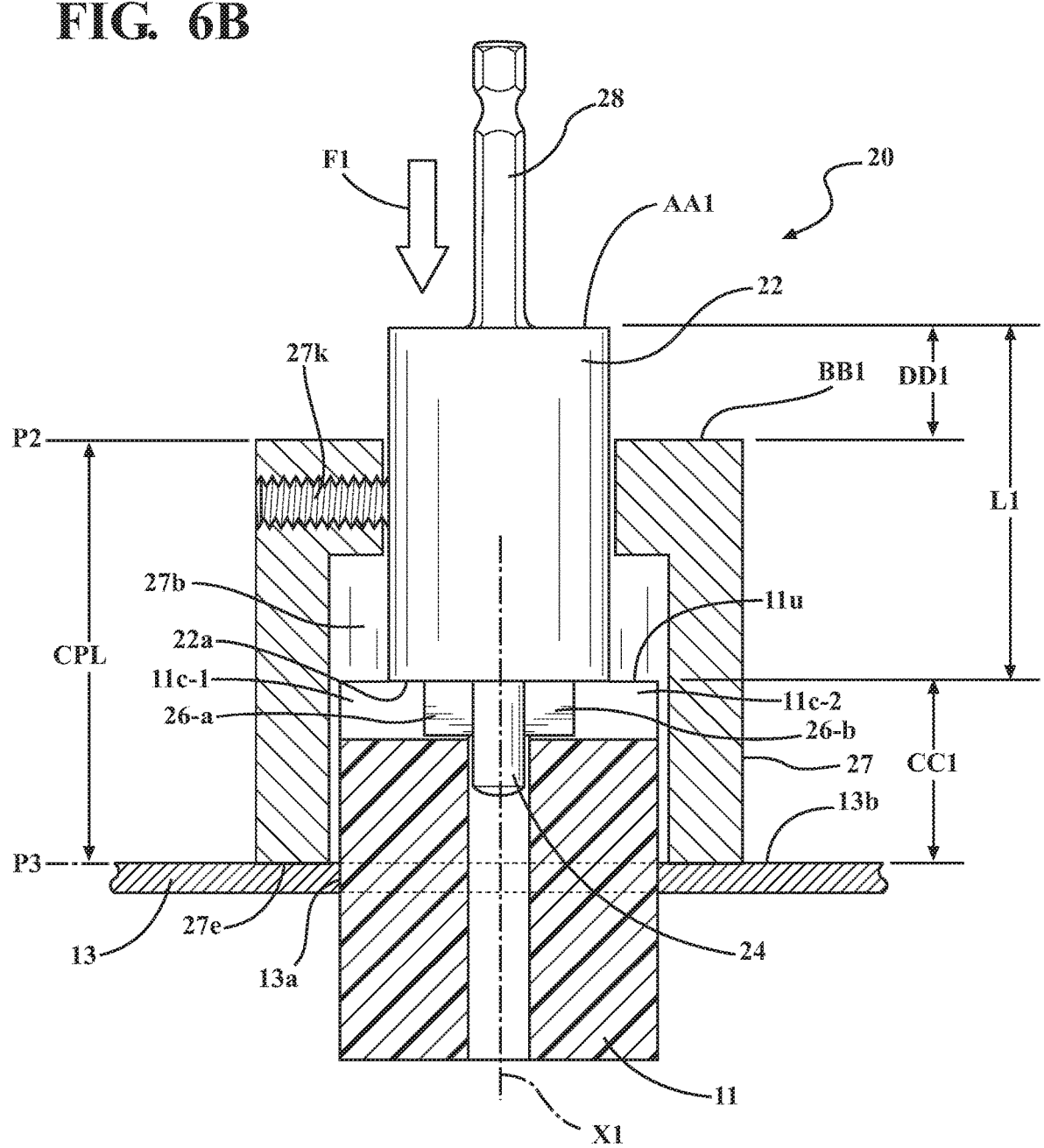
FIG. 6B is the view of FIG. 6A showing the hood cushion completely installed in the vehicle component.

The hood cushion 11 is considered to be completely installed in the vehicle component 13 when the hood cushion 11 has been inserted into the vehicle component 13 to a depth at which the cushion still extends a desired distance CC1 past or above the surface 13b of the component 13 of the vehicle (as shown in FIG. 6B, for example) for cushioning the hood. The distance CC1 may vary according to the requirements of a particular application. Hood cushion confinement portion 27 may be positionable and securable at a wide range of locations along the length L1 of the base portion 22, so as to enable a wide range of hood cushion insertion depths to be achieved. FIG. 4 illustrates an example of the adjustability of the hood cushion confinement portion 27 along the base portion 22, with a first position P1 of the hood cushion confinement portion 27 along the base portion 22 shown in phantom, and a second position P2 of the hood cushion confinement portion 27 along the base portion shown as a solid line. Hood cushion confinement portion 27 may be securable along the base portion using, for example, a set screw inserted into a hole 27k formed in the hood cushion confinement portion 27.

FIGS. 5A and 5B show one embodiment 11 of a hood cushion structured to be installed in a vehicle component 13 using an embodiment of the rotary tool accessory described herein. Referring to FIGS. 5A and 5B, in the embodiments shown in the drawings, hood cushion 11 is formed in the shape of a circular cylinder, although alternative shapes may be used. The hood cushion 11 may have a first end 11f, a second end 11s opposite the first end 11f, and a central opening 11b structured for receiving therein a trunk portion 24 extending from a base portion 22 of the rotary tool accessory 20, as described in greater detail below. Hood cushion first end 11f may be structured for insertion into the hole 13a vehicle component 13. Hood cushion second end 11s may be structured for engagement with rotary tool accessory 20, to enable the accessory to install the hood cushion 11 in the vehicle component.

The central opening 11b may be defined by a wall 11w and may be a through-opening as shown in FIGS. 5A and 5B, (i.e., extending through an entire length of the hood cushion 11), or the opening may be a blind opening. In one or more arrangements, the opening 11b may be sized in relation to an outer diameter or other outermost dimension of the trunk portion 24 extending from the rotary tool accessory base portion 22 so that the trunk portion engages the wall 11w in an interference fit, as shown in FIGS. 6A and 6B, for example. The interference fit formed between the wall and the trunk portion may aid the rotary tool accessory 20 in gripping and rotating the hood cushion 11 during installation of the hood cushion.

In the embodiment shown in FIGS. 5A-5B, hood cushion 11 also includes one or more hood cushion engagement portions 11c structured to engage complementary rotary tool accessory engagement portions formed on the rotary tool accessory 20 as described below. In the embodiment shown, the hood cushion engagement portions 11c are in the form of a pair of opposed, radially-extending hood cushion cavities 11c-1 and 11c-2 formed in hood cushion second end 11s. Each of hood cushion cavities 11c-1 and 11c-2 may extend between the central opening 11b and a radially-outermost surface 11r of the hood cushion 11. Each of hood cushion cavities 11c-1 and 11c-2 may be structured for receiving therein an associated one of rotary tool accessory engagement portions in the form of projections 26-a and 26b which extend along the rotary tool accessory trunk portion 24.

In one or more arrangements, it has been found that for a circular cylindrical hood cushion as shown in the drawings, confinement or restriction of cushion radial expansion RX1 to a maximum of 0.5 millimeters above an undeflected radius R1 of the cushion will help ensure that the cushion insertion forces F1 needed to press the cushion 11 deeper into a mounting hole will be maintained within acceptable limits. Thus, in one or more arrangements, the cavity 27b defined by hood cushion confinement portion 27 structured to confine lateral expansion of the cushion may have a maximum radius equal to R1+0.5 millimeter, where R1 is equal to a radius of the cushion 11 in an undeformed state.

Figure 10:
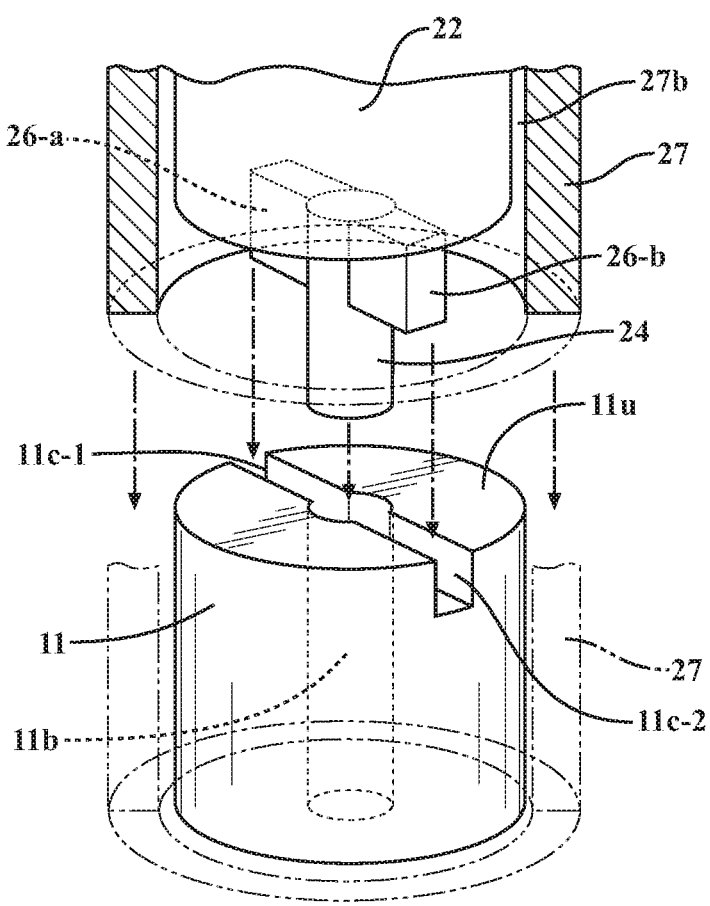
FIG. 10 is a schematic perspective view of a base portion including engagement projections being inserted into associated cavities formed in an upper surface of a hood cushion, in accordance with an embodiment described herein.

FIGS. 6A and 6B show an example of installation of a hood cushion 11 using the rotary tool accessory 20. FIG. 6A is a schematic cross-sectional side view showing the hood cushion 11 pre-positioned or partially installed in an hole 13a in the vehicle component 13, with rotary tool accessory 20 engaged with the hood cushion 11 prior to tool activation. The hood cushion 11 may be partially installed by hand or by any other means suitable to secure the hood cushion 11 in the hole 13a so that further installation may be started and completed using the rotary tool accessory 20. FIG. 10 is a schematic perspective view of a base portion 22 including engagement projections 26-a and 26-b being inserted into associated hood cushion cavities 11c-1 and 11c-2 formed in an upper surface 11u of a hood cushion 11, in accordance with an embodiment described herein.

Activation of the rotary tool produces rotation of the base portion 22, the trunk portion 24 extending from the base portion, the engagement projections 26-a and 26-b extending along the trunk portion 24, and the hood cushion confinement portion 27 attached to the base portion. At the same time, an insertion force F1 is applied by a user of the tool in the direction of the vehicle component 13, to push the hood cushion 11 deeper into the hole 13a. In the embodiment shown, engagement between the rotary tool accessory projections 26-a and 26b and the hood cushion 11 inside the hood cushion cavities 11c-1 and 11c-2 enables rotation of the rotary tool accessory 20 to rotate the hood cushion 11 for installation into the mounting hole 13a. Rotation of the hood cushion 11 during simultaneous application of insertion force F1 to the hood cushion aids in overcoming frictional forces between the walls of the mounting hole 13a and the exterior surfaces of the hood cushion. Although the hood cushion engagement portions 26-a, 26-b shown in FIGS. 6A, 6B are in the form of cavities, the hood cushion engagement portions may have any of a variety of alternative shapes as required or desired for a particular application.

FIG. 6B shows the hood cushion of FIG. 6A completely installed in the vehicle component 13. As seen from FIG. 6B, further motion of the rotary tool accessory 20 in the direction of the vehicle component 13 is prevented when an end 27e of the hood cushion confinement portion 27 abuts the surface 13b. The position at which the hood cushion confinement portion 27 is secured along the base portion 22 is specified such that the hood cushion confinement portion end 27e will abut the surface 13b of the vehicle component (thereby stopping further motion of the base portion 22 in the direction toward the vehicle component 13 and of and hood cushion 11 into the vehicle component) when the hood cushion 11 projects a distance CC1 above the surface 13b desired for proper functioning of the hood cushion.

For example, in the embodiment of the rotary tool accessory shown in FIGS. 4, 6A, and 6B, the length L1 of the base portion 22 may be taken as a distance between a rear reference surface AA1 of the base portion 22 from which the coupling portion 28 extends, and the bearing surface 22a structured to apply an insertion force F1 to an uppermost surface 11u of the hood cushion during installation. The end 27e of the hood cushion confinement portion 27 may define a plane P3 along which the hood cushion confinement portion 27 makes contact with the surface 13b of the vehicle component when the hood cushion 11 has been completely installed. The length CPL of the hood cushion confinement portion 27 may be taken as a distance between a reference surface BB1 of the hood cushion confinement portion 27 attachable to the base portion 22 and the plane P3 defined by the end 27e of the hood cushion confinement portion 27 structured to make contact with the surface 13b of the vehicle component 13. Then, to provide the desired extension CC1 of the cushion 11 above the vehicle component surface 13b in the embodiment shown, the hood cushion confinement portion 27 may be positioned and secured along an exterior of the base portion 22 so as to space the confinement portion reference surface BB1 apart from the base portion reference surface AA1 a distance of DD1, where DD1=L1+CC1−CPL.

In one or more arrangements, the hood cushion confinement portion 27 is structured and attached to the base portion 22 so as to maintain a constant minimum spacing between the engagement portion(s) residing within the hood cushion confinement portion cavity 27b and the hood cushion confinement portion cavity opening structured to receive the portion of the hood cushion therethrough, during operation of the rotary tool accessory to install the hood cushion in the vehicle component. For example, as shown in FIGS. 2-4 and 6A-6B, the hood cushion confinement portion 27 may be structured and attached to the base portion 22 so as to maintain a constant minimum spacing between engagement projections 26-a, 26-b residing within the hood cushion confinement portion first portion cavity and the hood cushion confinement portion cavity opening 27c during operation of the rotary tool accessory to install the hood cushion 11 in the vehicle component 13.

In one or more arrangements, the base portion, the at least one engagement portion, the hood cushion confinement portion and the hood cushion are structured, and the hood cushion confinement portion is attached to the base portion, such that all contact between the engagement portion(s) and the hood cushion occurs within the hood cushion confinement portion cavity during operation of the rotary tool accessory to install the hood cushion in the vehicle component. For example, as shown in FIGS. 2-4 and 6A-6B, the base portion 22, the engagement projections 26-a, 26-b, the hood cushion confinement portion 27 and the hood cushion 11 may be structured, and the hood cushion confinement portion 27 may be attached to the base portion 22, such that all contact between the at the engagement projections 26-a, 26-b and the hood cushion 11 occurs within the hood cushion confinement portion cavity 27b during operation of the rotary tool accessory 20 to install the hood cushion 11 in the vehicle component 13.

In one or more arrangements, the bearing surface (or surfaces), the hood cushion confinement portion, and the hood cushion are structured, and the hood cushion confinement portion is attached to the base portion, such that the bearing surface resides within the hood cushion confinement portion cavity during operation of the rotary tool accessory to install the hood cushion in the vehicle component. For example, in the embodiment shown in FIGS. 2-4 and 6A-6B, the bearing surface 22a, the hood cushion confinement portion 27, and the hood cushion 11 are structured such that the bearing surface resides within the hood cushion confinement portion cavity 27b during operation of the rotary tool accessory to install the hood cushion 11 in the vehicle component 13.

In one or more alternative arrangements, the hood cushion confinement portion may have a first portion structured to be attached to the base portion, and a second portion coupled to the first portion so as to be movable with respect to the first portion. The first portion may define a cavity structured to receive at least part of the second portion therein. The second portion may define the cavity structured to receive a portion of the hood cushion therein during operation of the rotary tool accessory. The second portion may include the opening into which the hood cushion extends during installation of the hood cushion in the component of the vehicle. Also, the second portion may include the end of the hood cushion confinement portion structured to contact the component of the vehicle during operation of the rotary tool accessory to install the hood cushion in the vehicle component. The hood cushion confinement portion second portion may also enclose the portion of the hood cushion extending into a mounting hole.

Some characteristics common to embodiments of the rotary tool accessory having a two-piece hood cushion confinement portion will now be described using the embodiment 120 shown in FIGS. 7A-7B as an example. It will be understood, however, that (unless otherwise noted) these characteristics may also apply to the rotary tool accessory embodiments 220 and 320 shown in FIGS. 8A-8B and 9A-9B, respectively.

Figure 7A:
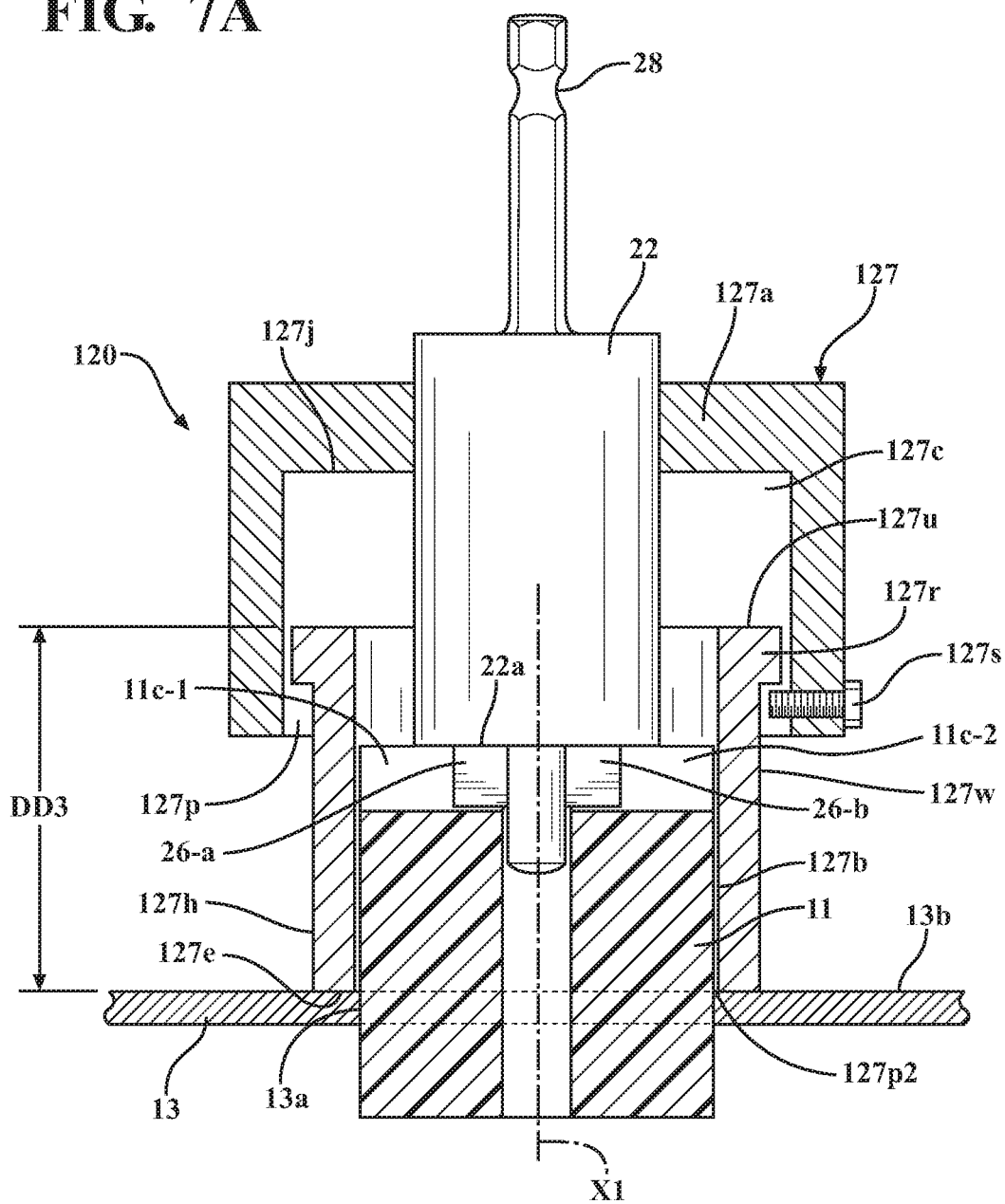
FIG. 7A is a schematic cross-sectional side view showing a hood cushion pre-positioned or partially installed in an opening in a vehicle component, with another embodiment of a rotary tool accessory engaged with the hood cushion prior to rotary tool activation.
Figure 7B:
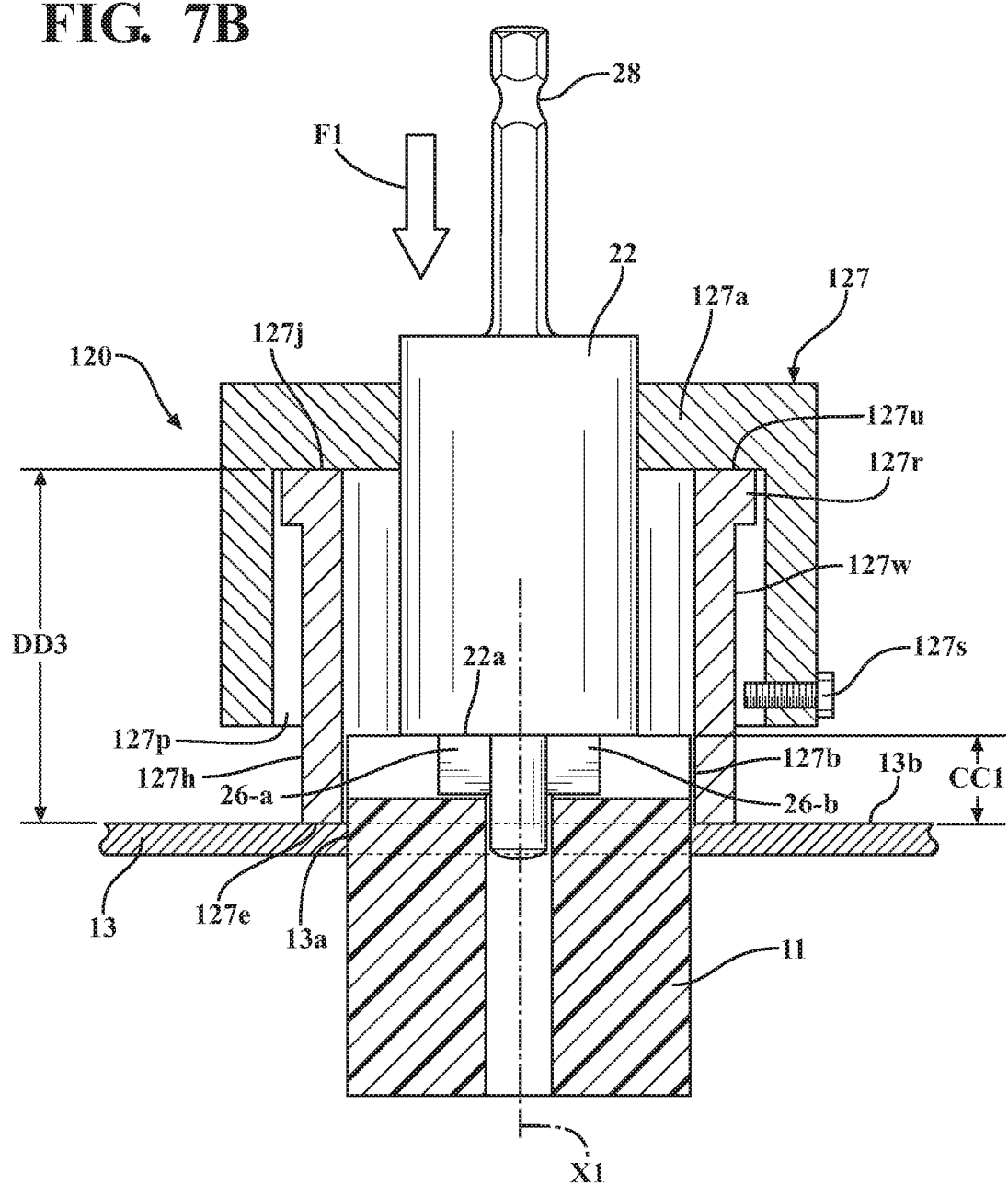
FIG. 7B is the view of FIG. 7A showing the hood cushion completely installed in the vehicle component.

For example, in the embodiment of the rotary tool accessory shown in FIGS. 7A-7B, the hood cushion confinement portion 127 may have a first portion 127a structured to be attached to the base portion 22, and a second portion 127h coupled to the first portion 127a so as to be movable with respect to the first portion. The first portion 127a may define a cavity 127c structured to receive at least part of the second portion 127h therein. The second portion 127h may define the cavity (in this case, cavity 127b) structured to receive a portion of the hood cushion 11 therein. The second portion 127h may include an opening 127p2 into which the hood cushion 11 extends during installation of the hood cushion 11 in the component 13 of the vehicle. Also, the second portion 127h may include the end 127e of the hood cushion confinement portion 127 structured to contact the component 13 of the vehicle during operation of the rotary tool accessory to install the hood cushion 11 in the vehicle component.

Also, in embodiments of the hood cushion confinement portion including a first portion and a second portion as described herein, a depth dimension (such as dimension DD3 shown in FIGS. 7A-9B) of the hood cushion confinement portion second portion may be specified at a minimum value desired for incorporating retention features as described herein for maintaining the first and second portions connected to each other, for preventing or restricting lateral expansion of a portion of the cushion 11 where the cushion extends into the hole in the vehicle component, and for any other features required for a particular embodiment. The hood cushion confinement portion second portion 127h may also enclose the portion of the hood cushion 11 extending into the mounting hole, to restrict lateral expansion of the cushion as previously described. The second portion 127h of the hood cushion confinement portion is designed to restrict lateral expansion of that portion of the cushion 11 closest to and entering the hole, during the entire period when the cushion is being installed in the portion 13 of the vehicle. The hood cushion confinement portion first portion 127a may be attached to the base portion 22 as previously described, and will remain attached in a fixed location along the base portion 22. Hood cushion confinement portion first portion 127a and second portion 127h may be movable with respect to each other along an axis of application of the insertion force F1, or an axis of installation X1 of the cushion 11 into a hole formed in the vehicle component 13.

The hood cushion confinement portion first portion 127a and second portion 127h may be secured to each other using any suitable means, to prevent the portions of the hood cushion confinement portion from separating. In one example, as shown in FIGS. 7A-7B, a first, retention shoulder 127r may be formed along an outer wall 127w of hood cushion confinement portion second portion 127h, and a retention member 127s (such as a screw, for example) may extend into the hood cushion confinement portion first portion cavity 127c between the retention shoulder 127r and an opening 127p leading into the hood cushion confinement portion first portion cavity 127c, to couple the hood cushion confinement portion second portion 127h to the hood cushion confinement portion first portion 127a. The retention member 127s may extend through a wall of hood cushion confinement portion first portion 127a. The length of retention member 127s and the dimensions of the shoulder 127r and an outer surface of the wall 127w of hood cushion confinement portion second portion 127h may be controlled so that contact between the outer surface 127z and the retention member 127s is prevented during rotation of the hood cushion confinement portion first portion 127a with respect to the hood cushion confinement portion second portion 127h. The dimensions are also controlled so that the end of the retention member 127s overlaps the shoulder 127r, as shown in FIGS. 7A and 7B to prevent the hood cushion confinement portion second portion 127h from being detached from the hood cushion confinement portion first portion 127a. Although a single retention member 127s is shown in the drawings, multiple retention members may be distributed about the circumference of the hood cushion confinement portion 127 and used to help retain the hood cushion confinement portion second portion 127h within the hood cushion confinement portion first portion 127a.

FIG. 7A is a schematic cross-sectional side view showing the hood cushion 11 pre-positioned or partially installed in an hole 13a in the vehicle component 13, with rotary tool accessory 120 engaged with the hood cushion 11 prior to tool activation. The hood cushion 11 may be partially installed by hand or by any other means suitable to secure the hood cushion 11 in the hole 13a so that further installation may be started and completed using the rotary tool accessory 120. Activation of the rotary tool produces rotation of the base portion 22, the trunk portion 24 extending from the base portion, the engagement portions 26-a and 26-b extending along the trunk portion 24, and the hood cushion confinement portion first portion 127a attached to the base portion 22. At the same time, an insertion force F1 is applied by a user of the tool in the direction of the vehicle component 13, to push the hood cushion 11 deeper into the hole 13b. Hood cushion confinement portion second portion 127h is in contact with the surface 13b of the vehicle component and encloses the portion of the hood cushion 11 entering the hole, to prevent or at least restrict lateral expansion of the portion of the cushion entering the hole 13a. Thus, the hood cushion confinement portion first portion 127a rotates with respect to the hood cushion confinement portion second portion 127h.

In the embodiment shown, engagement between the rotary tool accessory projections 26-a and 26b and the hood cushion 11 inside the hood cushion cavities 11c-1 and 11c-2 enables rotation of the rotary tool accessory 120 to rotate the hood cushion 11 for installation into the mounting hole 13a. Rotation of the hood cushion 11 during simultaneous application of insertion force F1 to the hood cushion aids in overcoming frictional forces between the walls of the mounting hole 13a and the exterior surfaces of the hood cushion. Although the hood cushion engagement portions 11c-1, 11c-2 shown in FIGS. 7A, 7B are in the form of cavities, the hood cushion engagement portions may have any of a variety of alternative shapes as required or desired for a particular application.

FIG. 7B shows the hood cushion of FIG. 7A completely installed in the vehicle component 13. As seen from FIG. 7B, further motion of the rotary tool accessory 120 in the direction of the vehicle component 13 is prevented when an end 127u of the hood cushion confinement portion second portion 127h abuts a stop surface 127j formed by part of the hood cushion confinement portion first portion 127a, within the hood cushion confinement portion first portion cavity 127c. The stop surface 127j may be structured to abut the hood cushion confinement portion second portion 127h when the hood cushion 11 is completely installed in the component 13 of the vehicle, to prevent further motion of the base portion 22 attached to the hood cushion confinement portion first portion 127a in a direction toward the component 13 of the vehicle. The position at which the hood cushion confinement portion 127 is secured along the base portion 22 may be specified such that the hood cushion confinement portion second portion 127h will abut the stop surface 127j (thereby stopping further motion of the base portion 22 and hood cushion 11 in the direction toward the vehicle component 13) when the hood cushion 11 projects a distance CC1 above the surface 13b desired for proper functioning of the hood cushion.

Friction between the various embodiments of the hood cushion confinement portion and the component 13 of the vehicle may be minimized by selection of a hood cushion confinement portion material having relatively low coefficients of kinetic friction with respect to the surfaces contacted by the rotating hood cushion confinement portion. For example, the hood cushion confinement portion may be formed from a PTFE (Polytetrafluoroethylene) material or a nylon material.

Figure 8A:
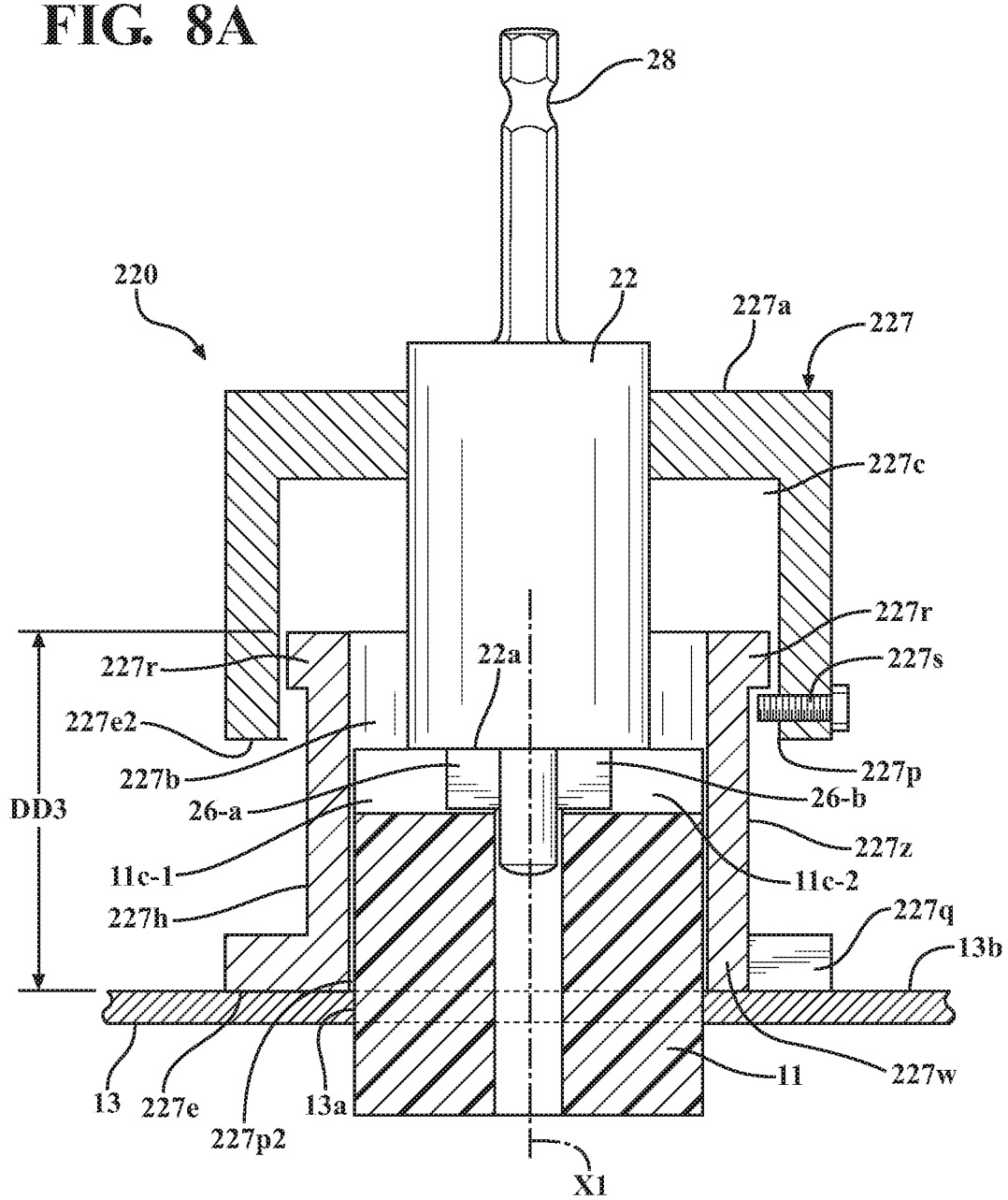
FIG. 8A is a schematic cross-sectional side view showing a hood cushion pre-positioned or partially installed in an opening in a vehicle component, with another embodiment of a rotary tool accessory engaged with the hood cushion prior to rotary tool activation.

In another example, in the embodiment of the rotary tool accessory shown in FIGS. 8A-8B, the hood cushion confinement portion 227 may have a first portion 227a structured to be attached to the base portion 22, and a second portion 227h coupled to the first portion 227a so as to be movable with respect to the first portion. The first portion 227a may define a cavity 227c structured to receive at least part of the second portion 227h therein. The second portion 227h may define the cavity (in this case, cavity 227b) structured to receive the portion of the hood cushion 11 therein. The second portion 227h may include an opening 227p2 into which the hood cushion 11 extends during installation of the hood cushion 11 in the component 13 of the vehicle. Also, the second portion 227h may include the end 227e of the hood cushion confinement portion 227 structured to contact the component 13 of the vehicle during operation of the rotary tool accessory to install the hood cushion 11 in the vehicle component. The hood cushion confinement portion second portion 227h may also enclose the portion of the hood cushion 11 extending into the mounting hole, to restrict lateral expansion of the cushion as previously described. The second portion 227h of the hood cushion confinement portion is designed to restrict lateral expansion of that portion of the cushion 11 closest to and entering the hole, during the entire period when the cushion is being installed in the portion 13 of the vehicle. The hood cushion confinement portion first portion 227a may be attached to the base portion 22 as previously described, and will remain attached in a fixed location along the base portion 22.

Hood cushion confinement portion first portion 227a and second portion 227h may be movable with respect to each other along an axis of application of the insertion force F1, or an axis of installation X1 of the cushion 11 into a hole formed in the vehicle component 13. The hood cushion confinement portion first portion 227a and second portion 227h may be secured to each other using any suitable means, to prevent the portions of the hood cushion confinement portion from separating. In one example, as shown in FIGS. 8A-8B, a first, retention shoulder 227r may be formed along an outer wall of hood cushion confinement portion second portion 227h, and a retention member 227s (such as a screw, for example) may extend into the hood cushion confinement portion first portion cavity 227c between the retention shoulder 227r and an opening 227p leading into the hood cushion confinement portion first portion cavity 227c, to couple the hood cushion confinement portion second portion 227h to the hood cushion confinement portion first portion 227a. The retention member 227s may extend through a wall of hood cushion confinement portion first portion 227a. The length of retention member 227s and the dimensions of the shoulder 227r and an outer surface 227z of the wall 227w of hood cushion confinement portion second portion 227h may be controlled so that contact between the outer surface 227z and the retention member 227s is prevented during rotation of the hood cushion confinement portion first portion 227a with respect to the hood cushion confinement portion second portion 227h. The dimensions are also controlled so that the end of the retention member 227s overlaps the shoulder 227r, to prevent the hood cushion confinement portion second portion 227h from being detached from the hood cushion confinement portion first portion 227a. Although a single retention member 227s is shown in the drawings, multiple retention members may be distributed about the circumference of the hood cushion confinement portion 227 and used to help retain the hood cushion confinement portion second portion 227h within the hood cushion confinement portion first portion 227a.

FIG. 8A is a schematic cross-sectional side view showing the hood cushion 11 pre-positioned or partially installed in an hole 13a in the vehicle component 13, with rotary tool accessory 220 engaged with the hood cushion 11 prior to tool activation. The hood cushion may be partially installed by hand or by any other means suitable to secure the hood cushion 11 in the hole 13a so that further installation may be started and completed using the rotary tool accessory 220. Activation of the rotary tool produces rotation of the base portion 22, the trunk portion 24 extending from the base portion, the engagement portions 26-a and 26-b extending along the trunk portion 24, and the hood cushion confinement portion first portion 227a attached to the base portion 22. At the same time, an insertion force F1 is applied by a user of the tool in the direction of the vehicle component 13, to push the hood cushion 11 deeper into the hole 13b. Hood cushion confinement portion second portion 227h is in contact with the surface 13b of the vehicle component and encloses the portion of the hood cushion 11 entering the hole, to prevent or at least restrict lateral expansion of the portion of the cushion entering the hole 13a. Thus, the hood cushion confinement portion first portion 227a rotates with respect to the hood cushion confinement portion second portion 227h.

In the embodiment shown, engagement between the rotary tool accessory projections 26-a and 26b and the hood cushion 11 inside the hood cushion cavities 11c-1 and 11c-2 enables rotation of the rotary tool accessory 220 to rotate the hood cushion 11 for installation into the mounting hole 13a. Rotation of the hood cushion 11 during simultaneous application of insertion force F1 to the hood cushion aids in overcoming frictional forces between the walls of the mounting hole 13a and the exterior surfaces of the hood cushion. Although the hood cushion engagement portions 11c-1 and 11c-2 shown in FIGS. 8A, 8B are in the form of cavities, the hood cushion engagement portions may have any of a variety of alternative shapes as required or desired for a particular application.

FIG. 8B shows the hood cushion 11 of FIG. 8A completely installed in the vehicle component 13. Hood cushion confinement portion second portion 227h has a second shoulder 227q formed therealong, and the hood cushion confinement portion first portion 227a has an end 227e2 positioned opposite the second shoulder 227q and structured to abut the second shoulder 227q when the hood cushion 11 is completely installed in the component 13 of the vehicle, to prevent further motion of the base portion 22 attached to the hood cushion confinement portion first portion 227a in a direction toward the component 13 of the vehicle. As seen from FIG. 8B, further motion of the rotary tool accessory 20 in the direction of the vehicle component 13 is prevented when the end 227e2 of the hood cushion confinement portion first portion 227a abuts the second shoulder 227q. The position at which the hood cushion confinement portion first portion 227a is secured along the base portion 22 may be specified such that the hood cushion confinement portion first portion 227a will abut the second shoulder 227q (thereby stopping further motion of the base portion 22 and hood cushion 11 in the direction toward the vehicle component 13) when the hood cushion 11 projects a distance CC1 above the surface 13b desired for proper functioning of the hood cushion.

Figure 9A:
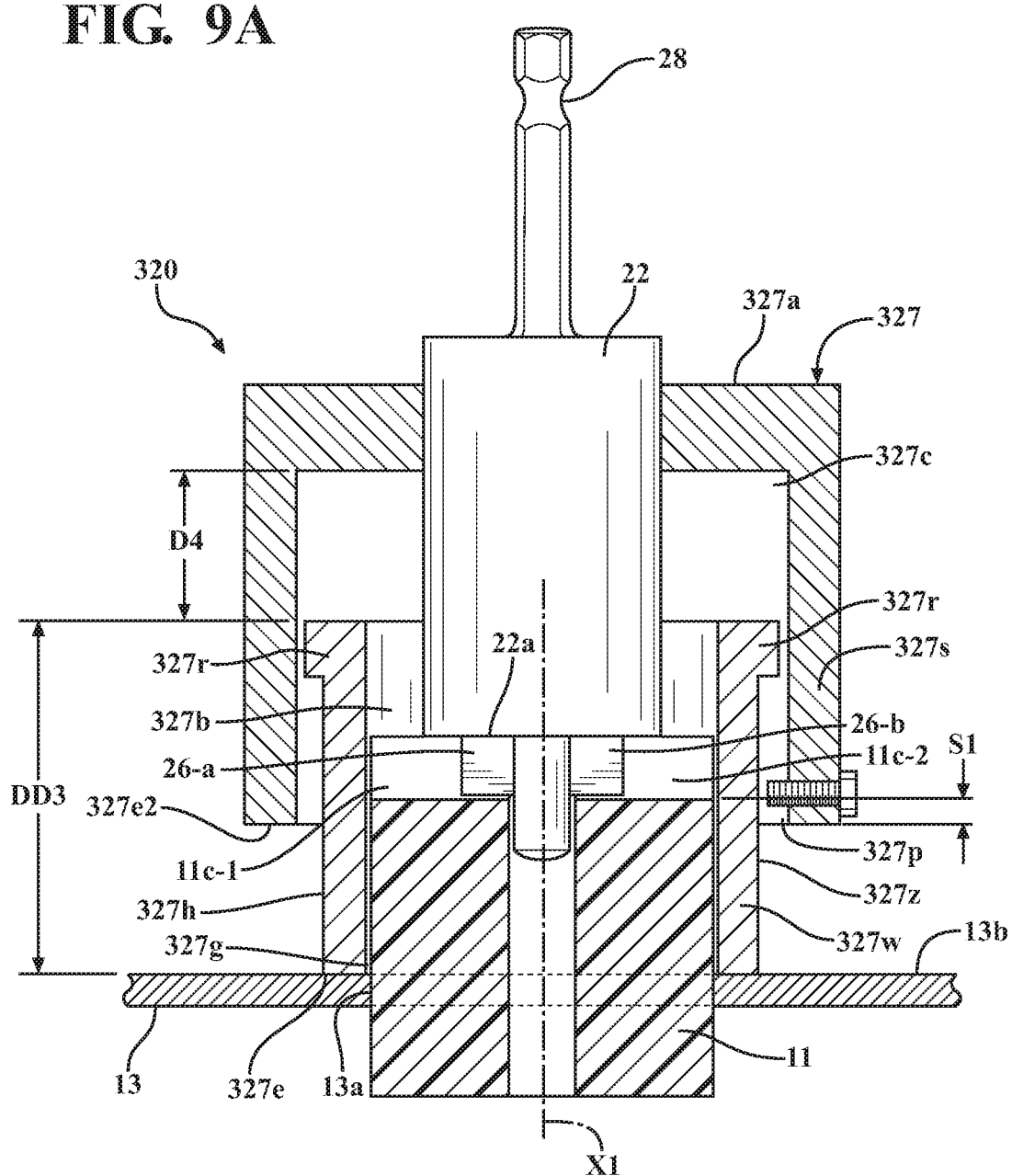
FIG. 9A is a schematic cross-sectional side view showing a hood cushion pre-positioned or partially installed in an opening in a vehicle component, with another embodiment of a rotary tool accessory engaged with the hood cushion prior to rotary tool activation.

In another example, in the embodiment of the rotary tool accessory shown in FIGS. 9A-9B, the hood cushion confinement portion 327 may have a first portion 327a structured to be attached to the base portion 22, and a second portion 327h coupled to the first portion 327a so as to be movable with respect to the first portion. The first portion 327a may define a cavity 327c structured to receive at least part of the second portion 327h therein. The second portion 327h may define the cavity (in this case, cavity 327b) structured to receive the portion of the hood cushion 11 therein. The second portion 327h may include an opening 327g into which the hood cushion 11 extends during installation of the hood cushion 11 in the component 13 of the vehicle. Also, the second portion 327h may include the end 327e of the hood cushion confinement portion 327 structured to contact the component 13 of the vehicle during operation of the rotary tool accessory to install the hood cushion 11 in the vehicle component.

The hood cushion confinement portion second portion 327h may also enclose the portion of the hood cushion 11 extending into the mounting hole, to restrict lateral expansion of the cushion as previously described. The second portion 327h of the hood cushion confinement portion is designed to restrict lateral expansion of that portion of the cushion 11 closest to and entering the hole, during the entire period when the cushion is being installed in the portion 13 of the vehicle. The hood cushion confinement portion first portion 327a may be attached to the base portion 22 as previously described, and will remain attached in a fixed location along the base portion 22. Hood cushion confinement portion first portion 327a and second portion 327h may be movable with respect to each other along an axis of application of the insertion force F1, or an axis of installation X1 of the cushion 11 into a hole 13a formed in the vehicle component 13.

The hood cushion confinement portion first portion 327a and second portion 327h may be secured to each other using any suitable means, to prevent the portions of the hood cushion confinement portion from separating. In one example, as shown in FIGS. 9A-9B, a first, retention shoulder 327r may be formed along an outer wall 327w of hood cushion confinement portion second portion 327h, and a retention member 327s (such as a screw, for example) may extend into the hood cushion confinement portion first portion cavity 327c between the retention shoulder 327r and an opening 327p leading into the hood cushion confinement portion first portion cavity 327c, to couple the hood cushion confinement portion second portion 327h to the hood cushion confinement portion first portion 327a. The retention member 327s may extend through a wall of hood cushion confinement portion first portion 327a. The length of retention member 327s and the dimensions of the shoulder 327r and an outer surface 327z of the wall 327w of hood cushion confinement portion second portion 327h may be controlled so that contact between the outer surface 327z and the retention member 327s is prevented during rotation of the hood cushion confinement portion first portion 327a with respect to the hood cushion confinement portion second portion 327h. The dimensions are also controlled so that the end of the retention member 327s overlaps the shoulder 327r, to prevent the hood cushion confinement portion second portion 327h from being detached from the hood cushion confinement portion first portion 327a. Although a single retention member 327s is shown in the drawings, multiple retention members may be distributed about the circumference of the hood cushion confinement portion 327 and used to help retain the hood cushion confinement portion second portion 327h within the hood cushion confinement portion first portion 327a.

FIG. 9A is a schematic cross-sectional side view showing the hood cushion 11 pre-positioned or partially installed in an hole 13a in the vehicle component 13, with rotary tool accessory 120 engaged with the hood cushion 11 prior to tool activation. The hood cushion may be partially installed by hand or by any other means suitable to secure the hood cushion 11 in the hole 13a so that further installation may be started and completed using the rotary tool accessory 120. Activation of the rotary tool produces rotation of the base portion 22, the trunk portion 24 extending from the base portion, the engagement portions 26-a and 26-b extending along the trunk portion 24, and the hood cushion confinement portion first portion 327a attached to the base portion 22. At the same time, an insertion force F1 is applied by a user of the tool in the direction of the vehicle component 13, to push the hood cushion 11 deeper into the hole 13b. Hood cushion confinement portion second portion 327h is in contact with the surface 13b of the vehicle component and encloses the portion of the hood cushion 11 entering the hole, to prevent or at least restrict lateral expansion of the portion of the cushion entering the hole 13a. Thus, the hood cushion confinement portion first portion 327a rotates with respect to the hood cushion confinement portion second portion 327h.

In the embodiment shown, engagement between the rotary tool accessory projections 26-a and 26b and the hood cushion 11 inside the hood cushion cavities 11c-1 and 11c-2 enables rotation of the rotary tool accessory 320 to rotate the hood cushion 11 for installation into the mounting hole 13a. Rotation of the hood cushion 11 during simultaneous application of insertion force F1 to the hood cushion aids in overcoming frictional forces between the walls of the mounting hole 13a and the exterior surfaces of the hood cushion. Although the hood cushion engagement portions 11c-1 and 11c-2 shown in FIGS. 9A, 9B are in the form of cavities, the hood cushion engagement portions may have any of a variety of alternative shapes as required or desired for a particular application.

FIG. 9B shows the hood cushion of FIG. 9A completely installed in the vehicle component 13. As seen in FIGS. 9A-9B, the hood cushion confinement portion first portion 327a has an end 327e2 structured to reside opposite the component 13 of the vehicle during operation of the rotary tool accessory 320 to install the hood cushion 11 in the vehicle component 13. Also, the hood cushion confinement portion first portion end 327e2 is structured to abut the component 13 of the vehicle in a manner similar to that shown in FIGS. 6A, 6B when the hood cushion 11 is completely installed in the component 13 of the vehicle, to prevent further motion of the base portion 22 attached to the hood cushion confinement portion first portion 327a in a direction toward the component 13 of the vehicle. The position at which the hood cushion confinement portion 327 is secured along the base portion 22 may be specified such that the hood cushion confinement portion first portion end 327e2 will abut the surface 13b of the vehicle component (thereby stopping further motion of the base portion 22 and hood cushion 11 in the direction toward the vehicle component 13) when the hood cushion 11 projects a distance CC1 above the surface 13b desired for proper functioning of the hood cushion.

In one or more particular arrangements of a rotary tool accessory incorporating a two-piece hood cushion confinement portion, the base portion includes a bearing surface (such as bearing surface 22a) structured to contact the hood cushion 11 so as to enable application of the insertion force F1 through the bearing surface to the hood cushion 11 during operation of the rotary tool accessory to install the hood cushion in the vehicle component 13. In addition, the bearing surface, the hood cushion confinement portion and the hood cushion are structured, and the hood cushion confinement portion is attached to the base portion, such that the bearing surface resides within the hood cushion confinement portion first portion cavity during operation of the rotary tool accessory to install the hood cushion in the vehicle component. For example, in the embodiment shown in FIGS. 9A and 9B, the engagement projections 26-a and 26-b, the base portion 22, the hood cushion confinement portion 327 and the hood cushion 11 are structured, and the hood cushion confinement portion 327 is attached to the base portion 22, such that the bearing surface 22a resides within the hood cushion confinement portion first portion cavity 327c during operation of the rotary tool accessory 120 to install the hood cushion 11 in the vehicle component. This helps ensure that a portion of the hood cushion 11 extends above the surface 13b of the component 13 of the vehicle.

In one or more particular arrangements of a rotary tool accessory incorporating a two-piece hood cushion confinement portion, the base portion, the engagement portion(s), the hood cushion confinement portion and the hood cushion are structured, and the hood cushion confinement portion is attached to the base portion, such that all contact between the engagement portion(s) and the hood cushion occurs within the hood cushion confinement portion first portion cavity during operation of the rotary tool accessory to install the hood cushion in the vehicle component. For example, in the embodiment shown in FIGS. 9A and 9B, the base portion 22, the engagement projections 26-a and 26-b, the hood cushion confinement portion 327 and the hood cushion 11 are structured, and the hood cushion confinement portion 327 is attached to the base portion 22, such that all contact between the engagement projections 26-a and 26-b and the hood cushion 11 occurs within the hood cushion confinement portion first portion cavity 327c during operation of the rotary tool accessory 320 to install the hood cushion 11 in the vehicle component 13. This helps ensure that a portion of the hood cushion 11 extends above the surface 13b of the component 13 of the vehicle.

In one or more particular arrangements of a rotary tool accessory incorporating a two-piece hood cushion confinement portion, the hood cushion confinement portion first portion is structured and attachable to the base portion so as to maintain a constant minimum spacing between the at least one engagement portion residing within the hood cushion confinement portion first portion cavity, and an opening of the hood cushion confinement portion first portion structured to receive the hood cushion confinement portion second portion into the hood cushion confinement portion first portion cavity during operation of the rotary tool accessory to install the hood cushion in the vehicle component. For example, in the embodiment shown in FIGS. 9A and 9B, the hood cushion confinement portion first portion 327a is structured and attachable to the base portion 22 so as to maintain a constant minimum spacing 51 between the engagement projections 26-a and 26-b residing within the hood cushion confinement portion first portion cavity 327c and an opening 327p of the hood cushion confinement portion first portion 327a structured to receive the hood cushion confinement portion second portion 327h into the hood cushion confinement portion first portion cavity 327c, during operation of the rotary tool accessory 320 to install the hood cushion 11 in the vehicle component 13. This helps ensure that a portion of the hood cushion 11 extends above the surface 13b of the component 13 of the vehicle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A rotary tool accessory structured for installing a hood cushion in a component of a vehicle, the rotary tool accessory comprising:
   a base portion structured to contact a hood cushion so as to enable rotation of the hood cushion by rotating the base portion, and so as to enable application of an insertion force to the hood cushion through the base portion and in a direction toward the component of the vehicle; and
   a hood cushion confinement portion having a first portion structured to be attached to the base portion so as to be non-moving with respect to the base portion during operation of the rotary tool accessory to install the hood cushion, and a second portion coupled to the first portion so as to be movable with respect to the first portion, the first portion defining a cavity structured to receive at least part of the second portion therein, the second portion being structured to enclose a portion of the hood cushion so as to limit or prevent radial expansion of the portion of the hood cushion during installation of the hood cushion into the component of the vehicle, the second portion including an end of the hood cushion confinement portion structured to contact the component of the vehicle during operation of the rotary tool accessory to install the hood cushion in the component of the vehicle, so as to enclose a portion of the hood cushion extending into a mounting hole.

2. The rotary tool accessory of claim 1 further comprising at least one engagement portion supported by the base portion and structured to engage a complementary engagement portion of the hood cushion to enable rotation of the hood cushion by rotating the base portion.

3. The rotary tool accessory of claim 2 further comprising a trunk portion extending from the base portion, and wherein the at least one engagement portion is a projection extending from the trunk portion and structured to be received in a complementary cavity formed in the hood cushion.

4. The rotary tool accessory of claim 3 wherein the trunk portion is structured to extend into a central opening formed in the hood cushion during operation of the rotary tool accessory to install the hood cushion in the component of the vehicle.

5. The rotary tool accessory of claim 3 comprising a first projection extending from the trunk portion, and a second projection extending the trunk portion opposite the first projection, each of the first projection and the second projection being structured to be received in an associated complementary cavity formed in the hood cushion.

6. The rotary tool accessory of claim 2 wherein the base portion, the at least one engagement portion, the hood cushion confinement portion and the hood cushion are structured, and the hood cushion confinement portion is attached to the base portion, such that all contact between the at least one engagement portion and the hood cushion occurs within the hood cushion confinement portion second portion cavity during operation of the rotary tool accessory to install the hood cushion in the component of the vehicle.

7. The rotary tool accessory of claim 2 wherein the hood cushion confinement portion first portion is structured and attachable to the base portion so as to maintain a constant minimum spacing between the at least one engagement portion and an opening of the hood cushion confinement portion first portion structured to receive the hood cushion confinement portion second portion into the hood cushion confinement portion first portion cavity during operation of the rotary tool accessory to install the hood cushion in the component of the vehicle.

8. The rotary tool accessory of claim 7 wherein the base portion includes a bearing surface structured to contact the hood cushion so as to enable application of the insertion force through the bearing surface to the hood cushion during operation of the rotary tool accessory to install the hood cushion in the vehicle component, and wherein the bearing surface, the hood cushion confinement portion, and the hood cushion are structured such that the bearing surface resides within the hood cushion confinement portion first portion cavity during operation of the rotary tool accessory to install the hood cushion in the component of the vehicle.

9. The rotary tool accessory of claim 7 wherein the at least part of the hood cushion confinement portion second portion received in the hood cushion confinement portion first portion cavity has a first shoulder formed therealong, wherein the rotary tool accessory further comprises at least one retention member extending into the hood cushion confinement portion first portion cavity between the first shoulder and an opening leading into the hood cushion confinement portion first portion cavity, to couple the hood cushion confinement portion second portion to the hood cushion confinement portion first portion.

10. The rotary tool accessory of claim 9 wherein the hood cushion confinement portion second portion has a second shoulder formed therealong, and the hood cushion confinement portion first portion has an end positioned opposite the second shoulder and structured to abut the second shoulder when the hood cushion is completely installed in the component of the vehicle, to prevent further motion of the base portion attached to the hood cushion confinement portion first portion in a direction toward the component of the vehicle.

11. The rotary tool accessory of claim 7 wherein the hood cushion confinement portion first portion has a stop surface positioned within the hood cushion confinement portion first portion cavity, the stop surface being structured to abut the hood cushion confinement portion second portion when the hood cushion is completely installed in the component of the vehicle, to prevent further motion of the base portion attached to the hood cushion confinement portion first portion in a direction toward the component of the vehicle.

12. The rotary tool accessory of claim 7 wherein the hood cushion confinement portion first portion has an end structured to reside opposite the component of the vehicle during operation of the rotary tool accessory to install the hood cushion in the component of the vehicle, and wherein the hood cushion confinement portion first portion end is structured to abut the component of the vehicle when the hood cushion is completely installed in the component of the vehicle, to prevent further motion of the base portion attached to the hood cushion confinement portion first portion in a direction toward the component of the vehicle.

13. The rotary tool accessory of claim 2 wherein the second portion includes a shoulder, and wherein the first portion and the second portion shoulder are structured so that the first portion abuts the second portion shoulder when the hood cushion extends the predetermined distance past the surface of the component of the vehicle in a direction toward the base portion, so as to stop further movement of the base portion in the direction toward the component of the vehicle.

14. The rotary tool accessory of claim 13 wherein the second portion shoulder is structured so that contact between the first portion and the second portion shoulder prevents contact of the first portion with the component of the vehicle.

15. The rotary tool accessory of claim 1 wherein the hood cushion confinement portion second portion is structured to receive therein at least a portion of a hood cushion having a circular cylindrical undeformed shape with a central axis, and wherein the hood cushion confinement portion second portion has at least one wall defining a hood cushion confinement portion cavity, the at least one wall being structured to limit a radial expansion of the hood cushion to a maximum of 0.5 millimeters during operation of the rotary tool accessory to install the hood cushion in the component of the vehicle.

* * * * *